United States Patent

[11] 3,554,210

| [72] | Inventor | Gene W. Osheroff |
|---|---|---|
| | | 2740 S. Highland Drive, Las Vegas, Nev. 89102 |
| [21] | Appl. No. | 836,328 |
| [22] | Filed | June 25, 1969 |
| [45] | Patented | Jan. 12, 1971 |

[54] FLUID AMPLIFIER CONTROL DEVICE
4 Claims, 1 Drawing Fig.

[52] U.S. Cl. .................................................. 137/81.5, 236/97
[51] Int. Cl. ....................................................... F15c 3/00, F15c 1/04
[50] Field of Search .......................................... 137/81.5; 236/97

[56] References Cited
UNITED STATES PATENTS

| 3,091,393 | 5/1963 | Sparrow ....................... | 137/81.5 |
| 3,198,431 | 8/1965 | Gessell .......................... | 137/81.5X |
| 3,279,531 | 10/1966 | Bowles ........................... | 137/81.5X |

*Primary Examiner*—William R. Cline
*Attorney*—Allen E. Botney

ABSTRACT: The present invention provides a new way for controlling the switching of fluid streams in a pure fluid amplifier device that is especially useful in air-conditioning systems. First, motor-driven paddles are used to selectively close the device's control channels, the operation of the motor being initiated by a thermostat, and, second, it avoids ambient air from getting into the main air-conditioned stream.

PATENTED JAN 12 1971
3,554,210
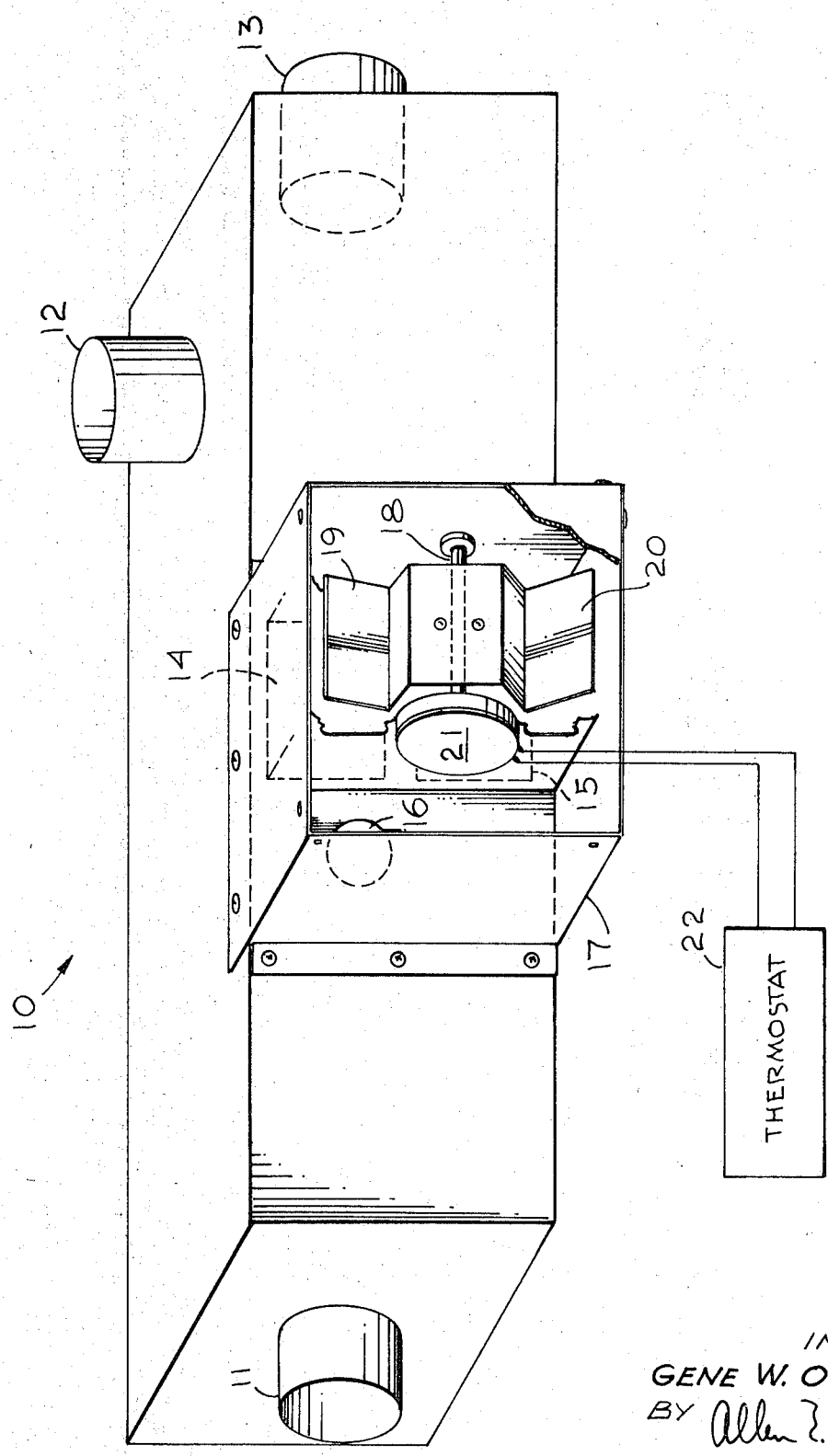
INVENTOR
GENE W. OSHEROFF
BY Allen E. Botney
ATTORNEY

FLUID AMPLIFIER CONTROL DEVICE

The present invention relates to pure fluid amplifier devices in general and more particularly relates to a new and novel arrangement for controlling the fluid flow through such a device.

As is well known, a pure fluid amplifier, whether it be of the monostable or of the bistable kind, includes, among other things, an inlet channel through which the fluid stream enters, a pair of outlet channels through one or the other of which the fluid stream that enters the inlet channel selectively flows, and a pair of control channels by means of which the flow of the fluid stream can be controlled so as to selectively direct it to one or the other of the outlet channels. There have been several ways in the past by means of which this directional control of the stream could be exercised. Thus, one way was to create a partial vacuum and appropriately direct it against the stream through one or the other of the control channels, thereby causing the stream to switch from one to the other of the outlet channels. An equivalent technique was to direct a suitable jet of the fluid through one of the control channels and against the stream. A third way has been to mount an electrically driven solenoid over one or both of the control channels. When operated, the entrance to the associated control channel is blocked, and this has the effect of creating a vacuum in that channel which, as previously indicated, produces the desired switching of the stream.

While these prior art techniques were and still are perfectly satisfactory for many different kinds of applications and environments, they are not, however, very satisfactory for others, for example, such as in the air-conditioning field. More particularly, in the prior art, the control channel that does not receive the partial vacuum or the jet, or that is not closed off by the solenoid, is exposed to the ambient air which then gets into the fluid stream. While this is unimportant in most instances, it is obviously undesirable in the air-conditioning field, since the ambient air could only have the effect of altering the temperature of the conditioned air.

Accordingly, it is an object of the present invention to provide new means for selectively controlling the flow of a fluid stream through a fluid amplifier.

It is another object of the present invention to provide a fluid amplifier device especially suitable in the air-conditioning field.

It is a further object of the present invention to provide a fluid amplifier device whose fluid stream is not exposed to the ambient air.

The novel features which are believed to be characteristic of the invention, both as to its organization and method of operation, together with further objects and advantages thereof, will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

Referring now to the drawing, a preferred embodiment of a pure fluid amplifier device according to the present invention is shown to include a chamber section, generally designated 10, an inlet channel 11, at one end of this chamber section and a pair of outlet channels, 12 and 13, respectively, at the other end of the chamber section. The fluid stream enters the device via inlet channel 11, passes through chamber section 10 where, by means of the controls exercised on the fluid stream, as will be seen below, the stream is selectively directed to one or the other of outlet channels 12 and 13. In the event the device is used in an air-conditioning line, then in that event inlet channel 11 would be coupled to a supply duct from which the air-conditioned air would be received, the air respectively flowing through outlet channels 12 and 13 either to the zone to be air-conditioned or to a return duct.

Also shown in the FIG. are the openings or entrances 14 and 15 to a pair of control channels by means of which the above-said fluid stream can be controlled so as to selectively direct the stream to one or the other of the outlet channels. Although openings 14 and 15 are shown located on the same side of chamber section 10, it is well known and, therefore, will be recognized by those skilled in the art that the control channels respectively couple to opposite sides of the chamber so that the forces that switch the stream from one outlet channel to the other can be applied to one or the other of its sides. Finally, alongside or near openings 14 and 15, at a point between these openings and inlet channel 11, is an opening or hole 16 that extends completely through the wall of the chamber section, the hole being large enough to siphon off a small portion of the fluid in the main fluid stream. Thus, for example, if an air-conditioning system were involved, a small percentage of the conditioned air would exit from this hole 16 and the reason for it will become clearer below.

Mounted on the amplifier is a canlike structure 17 that covers or encloses the entrances 14 and 15 to the control channels and also hole 16. Structure 17 is mounted so as to provide a pretty good seal between itself and the wall of the amplifier, with the result that the fluid siphoned off by hole 16 enters the enclosure that is thereby formed and exits through either of openings 14 and 15. Also enclosed within structure 17 is a rotatively mounted shaft 18 on which are mounted a pair of paddles or vanes 19 and 20. At one end of shaft 18 and coupled to it is a small motor 21 that is adapted to and capable of rotating the shaft in one direction or the other, that is to say, either in a clockwise or in a counterclockwise direction, in response to the electrical signals applied thereto. Such motors are well known in the art, a stepping motor being an example of one.

With respect to paddles 19 and 20, these are respectively positioned in the proximity of openings 14 and 15 and they are of a size and shape such that they will cover up one or the other of these control channel openings depending on which way shaft 18 is rotated by motor 21. Thus, when rotated in one direction, opening 14 is covered up and the control channel thereof closed off by paddle 19, with the result that the fluid (conditioned air if an air-conditioning system is involved) entering via hole 16 exits through opening 15. On the other hand, when rotated in the other direction, opening 15 is covered up and its channel closed off by paddle 20, with the result that the fluid entering via hole 16 exits through opening 14. As will be seen below, this is important in the process of switching the main fluid stream from one outlet channel to another.

Completing the structural arrangement in the FIG., as would be the case for an air-conditioning system, is a thermostat 22 that is normally located in the zone to be air-conditioned. The thermostat is electrically coupled to motor 21 and is operable in response to the temperature conditions in the zone to apply electrical signals to the motor that will drive it in one direction or the other.

In considering the operation of the amplifier device, it will initially be assumed that the flow is through outlet channel 12. Accordingly, when the opening for the near control channel, for example opening 14, is closed by paddle 19, the conditioned air flows through the control channel associated with opening 15 and impinges against the main stream. However, this doesn't happen in the control channel of opening 14 wherein a partial vacuum develops instead. As a result, and in accordance with well enunciated principles known to those skilled in the art, the main stream is switched over to outlet channel 13. Of course, the reverse would be true in that the flow would be switched from outlet channel 13 to outlet channel 12 if opening 15 were closed by paddle 20. As previously indicated, the operation of the paddles is controlled by the motor which, in turn, is controlled by the thermostat.

Although a particular arrangement of the invention has been illustrated and described above by way of example, it is not intended that the invention be limited thereto. Accordingly, the invention should be considered to include any and all modifications, alterations or equivalent arrangements falling within the scope of the annexed claims.

I claim:

1. The combination comprising: a pure fluid amplifier through which a fluid stream flows, said amplifier including an inlet channel for said fluid stream, a pair of outlet channels to which said fluid stream is selectively directed, a chamber coupled between said outlet channels and said inlet channel, a pair of control channels respectively exiting on opposite sides of said chamber and on opposite sides of the fluid stream flowing therein, the entrances to said control channels being on the same side of said amplifier, and an opening through the wall of said amplifier located adjacent the entrances to said control channels and between said chamber and said inlet channel, said opening being operable to siphon off a portion of said fluid stream therethrough; a structure mounted on said amplifier and enclosing both said opening and the entrances to said control channels therebetween, the portion of the fluid stream siphoned off by said opening entering the enclosed space; and means mounted within said structure for selectively closing one of the entrances to said control channels in response to an electrical signal to switch said fluid stream from one of said outlet channels to the other.

2. The combination defined in claim 1 wherein said means includes a pair of paddles rotatably mounted to selectively cover one of the entrances to said control channels, and apparatus for selectively rotating said paddles in one direction and another in response to an electrical signal.

3. The combination defined in claim 2 wherein said apparatus includes a rotatably mounted shaft, said paddles being mounted on said shaft, spaced from the entrances to said control channels and in face-to-face relationship therewith, and a motor operable in response to an electrical signal to selectively rotate said shaft in said one direction and another.

4. The combination defined in claim 3 wherein said combination further includes a thermostat at the zone to be air-conditioned to produce an electrical signal, in accordance with temperature conditions thereat, said thermostat being coupled to said motor for application of said signal thereto.